United States Patent [19]
Wilson

[11] Patent Number: 5,036,236
[45] Date of Patent: Jul. 30, 1991

[54] AIR GAP MATCHING PROXIMITY SENSOR FOR MAGNETIC BEARINGS

[75] Inventor: Douglas W. Wilson, Westlake Village, Calif.

[73] Assignee: Hughes Aircraft Company, Los Angeles, Calif.

[21] Appl. No.: 520,000

[22] Filed: May 7, 1990

[51] Int. Cl.[5] .................. H02K 7/09; F16C 39/06; G01B 7/14
[52] U.S. Cl. .................. 310/90.5; 324/207.19; 324/207.26
[58] Field of Search .................. 310/90.5, 168, 254; 324/207.19, 207.26, 225, 545, 546, 207.16, 229, 230

[56] References Cited

U.S. PATENT DOCUMENTS

| | | | |
|---|---|---|---|
| 2,266,620 | 12/1941 | Coffman | 324/230 |
| 3,845,995 | 11/1974 | Wehde | 310/90.5 |
| 4,652,820 | 3/1987 | Maresca | 310/90.5 |
| 4,771,238 | 9/1988 | Caruso et al. | 324/225 |
| 4,786,869 | 11/1988 | Kanai et al. | 324/207.26 |
| 4,901,017 | 2/1990 | Zinke | 324/220 |
| 4,994,738 | 2/1991 | Soyck et al. | 324/207.26 |

*Primary Examiner*—R. Skudy
*Assistant Examiner*—D. L. Rebsch
*Attorney, Agent, or Firm*—William J. Streeter; Wanda K. Denson-Low

[57] ABSTRACT

A pricisely dimensioned gap between relatively movable surfaces (14,16) is maintained in a magnetic bearing by use of proximity sensors (22a, 22b, 23a, 23b). Each sensor includes a magnetic assembly (32) having a bar core (36) secured to a middle leg (42) of an F-shaped core (34). The bar core and the vertical leg (38) of the F-shaped core have approximately equal lengths. The magnetic assembly is fixed with respect to one of the surfaces (16) and is so positioned that the end (52,54) of the F-core vertical leg (38) and the bar core are spaced from the other surface (14) to provide the variable gap dimension. The end (48) of the suppermost leg (40) of the F-shaped core is spaced from the bar core and provides a reference dimension (44). Any differences in the variable gap and reference dimensions are furnished to a driver (27, 72-86) which moves one surface with respect to the other until the gap dimension corresponds to the reference dimension. By making the magnetic materials of the F-core and the bar core the same, the magnetic path lengths approximately the same and the permeability of the magnetic material high over the desired temperature range, by matching the sensor housing temperature coefficient with that of the core, the differential reluctance of the two parallel paths is mode inherently insensitive to temperature changes. Accordingly, the sensor null displacement becomes solely determined by the condition where the clearance between the moving and fixed parts is equal to the reference gap.

12 Claims, 6 Drawing Sheets

AIR GAP MATCHING PROXIMITY SENSOR FOR MAGNETIC BEARINGS

This invention was made with Government support under contract F29601-85C-0107 awarded by the Department of the Air Force. The Government has certain rights in this invention.

BACKGROUND OF THE INVENTION

The present invention relates to magnetic bearings and, more particularly, to precise positioning of the air gaps between relatively movable parts in such bearings.

Magnetic bearings are a preferred bearing used where frictionless, longlife support is needed. The absence of friction in a magnetic bearing allows significant improvement in performance of any precision servo system, such as used in space sensor gimbal suspensions and reaction wheels for spacecraft attitude control, where the combination of better control system performance plus long life are much sought after parameters. Other uses include long life spindle bearings and machine shop applications.

Three commercially available proximity sensors include the Schaevtz variable inductance sensor, the Kaman eddy current sensor, and the Bently Nevada eddy current sensor. All these devices are temperature sensitive, and the eddy current type is particularly so. All depend on use in matched pairs to measure displacement differentially, thus to achieve modest temperature insensitivity over a limited range. The long term null stability of all these devices depends on other reactive circuit elements in an alternating current bridge circuit.

In a magnetic bearing application, a proximity sensor is used to control the radial clearance between the fixed and moving member via a servo system. If the proximity sensor null drifts, for example as a function of temperature, the bearing ceases to function as a friction free device and may even destroy itself due to contact between the stationary and moving members.

SUMMARY OF THE INVENTION

These and other considerations are successfully addressed in the present invention by maintaining a precisely dimensioned gap between relatively movable surfaces, sensing the dimension of the gap, comparing the gap dimension with a reference dimension, and conforming the gap dimension to the reference dimension.

Specifically, the device embodied by the present invention is an audio frequency transformer with two parallel magnetic circuits formed by an F-shaped core, defined by a supporting leg and center and upper legs extending from the supporting leg, and a mating bar core. The ends of the supporting leg and the bar core are spaced from, and form a pair of air gaps in series with an adjacently positioned surface of a target. The center of the F shaped core is slightly longer than the upper leg so that, when the bar core is clamped in place, an air gap is formed between the bar core and the upper leg of the F-shaped core. This gap defines a reference air gap and, with the clamped together bar and F-shaped core, forms a closed magnetic path which defines a reference magnetic circuit. A second closed magnetic circuit is formed by ends of the supporting F-shaped core leg and bar core, the target, and the serially positioned pair of air gaps therebetween. The spacing of the material of the target to the exposed ends is the quantity measured by the device in the form of an electrical output signal.

To implement this measurement, a primary winding is placed on the central leg of the F-shaped core, and a secondary winding is placed on the bar core in both first and second magnetic circuits. The primary winding is excited by connecting it to an audio frequency power source causing alternating flux to flow in the parallel magnetic circuits and to induce voltage in the two secondary windings. The two secondary windings are connected in such a way that a voltage null is produced when the reference air gap and the pair of air gaps in series are equal in length. Thus, the output signal amplitude of the device is a measure of the difference of the target and reference air gap dimensions, and the polarity of the signal indicates whether the reference air gap is larger or smaller than the target air gap.

The output voltage null is produced when the reluctance (or resistance to flow of magnetic flux) in the two parallel magnetic circuits is equal. Since the reluctance of the air gaps is many times larger than that of the core, the device is essentially an air gap matching sensor. By making the magnetic materials of the F-shaped core and the bar core the same, by making the magnetic path lengths approximately the same, by making the permeability of the magnetic material high over the desired temperature range, and by matching the temperature coefficients of the sensor housing and the core, the differential reluctance of the two parallel paths is inherently insensitive to changes in temperature. Accordingly, the sensor null displacement becomes almost solely determined by the condition where the clearance between the moving and the fixed parts is equal to the reference gap.

If the device is used to sense the clearance between the stationary and moving members of a magnetic bearing, the current in the winding of the bearing electromagnet is controlled by feedback from the proximity sensor to precisely levitate the moving member relative to the fixed member with a clearance equal to the air gap installed in the sensor.

Several advantages are derived from this arrangement. The clearance gap between the bearing components in a magnetic bearing can be precisely controlled in a stable manner without the necessity for physical contact. Long term null stability is assured by the inherent temperature insensitivity of the device allowing long term usage without a requirement for periodic adjustment or alternatively direct usage in a highly variable temperature environment with little variation in the controlled clearance.

Other aims and advantages, as well as a more complete understanding of the present invention, will appear from the following explanation of exemplary embodiments and the accompanying drawings thereof.

DESCRIPTION OF THE DRAWINGS

FIGS. 1 through 7 describe the laboratory model employed to prove the concept of the present invention, by using an actual proximity sensor to measure the clearance of a magnetic bearing and comparing the results to the performance predicted by analysis. The model simulates the clearance gap geometry of a magnetic bearing where the radial clearance between the stationary and moving bearing elements were varied manually with a lead screw and measured by an electronic micrometer. The proximity sensor was mounted on a flat machined outer cylindrical surface of the simulated magnetic bearing stationary member. Magnetic plugs were installed to extend the magnetic circuit of the sensor through the non-magnetic cylindrical wall. A target ring of magnetic material required by the proximity sensor was installed in a slot machined into the cylindrical surface of the simulated magnetic bearing moving member. A plot of the electronic micrometer reading versus the electrical output of the proximity sensor, as the radial clearance was varied, mechanically produced the nearly linear calibration characteristic of the sensor shown in FIG. 5. This test set up accurately simulated the air gap geometry of a develop-mentally produced magnetic bearing, shown in FIGS. 6 and 7.

FIG. 1 is a schematic diagram showing two pairs of sensors in their orthogonal mechanical relationship on the simulated magnetic bearing assembly as well as the manual clearance control and electronic micrometer measurement system. FIG. 1 also shows the electronic components of the proximity sensor system that are located remote from the bearing assembly.

FIG. 2 is an exploded view of the simulated magnetic bearing assembly showing the manual lead screw air gap manipulation system and the location of the four proximity sensors.

FIG. 3 is a schematic view showing the components making up the proximity sensor and their relationship to the magnetic bearing assembly which is provided with a flat mounting surface for the sensor, magnetic cylinder wall feedthrough plugs, and a magnetic target ring on the piston.

FIG. 5 depicts a measured calibration characteristic of the proximity sensor using the simulated magnetic bearing test fixture of FIG. 2 to make the measurements. The data is plotted as piston/cylinder displacement from center, measured by the electrical micrometer versus dc output of the signal conditioning electronics.

FIG. 6 illustrates a cryocooler pump assembly where the piston is levitated by the magnetic bearing system in the radial clearance zone of the stationary cylinder. Two active type magnetic bearings are mounted on the stationary cylinder, and target iron rings are provided on the moving piston to complete the magnetic circuit of the magnetic bearings. Ferrite target rings are provided in slots on the piston assembly as the proximity sensor magnetic targets. Two pairs of proximity sensors are installed for each magnetic bearing; the sensors are mounted with their sensitive axes arrayed orthogonally in a plane normal to the cylinder axes and outboard from the center of force of each magnetic bearing.

FIG. 7 is a schematic view of the active type magnetic bearing used in the assembly of FIG. 6. This type of magnetic bearing has four poles, with four electromagnets wound on the pole pieces, four samarium cobolt permanent magnets are placed between the poles. All flux paths are closed via the clearance gaps and the magnetic target ring on the piston.

DETAILED DESCRIPTION OF THE PREFERRED EMBODIMENTS

Figure 1:
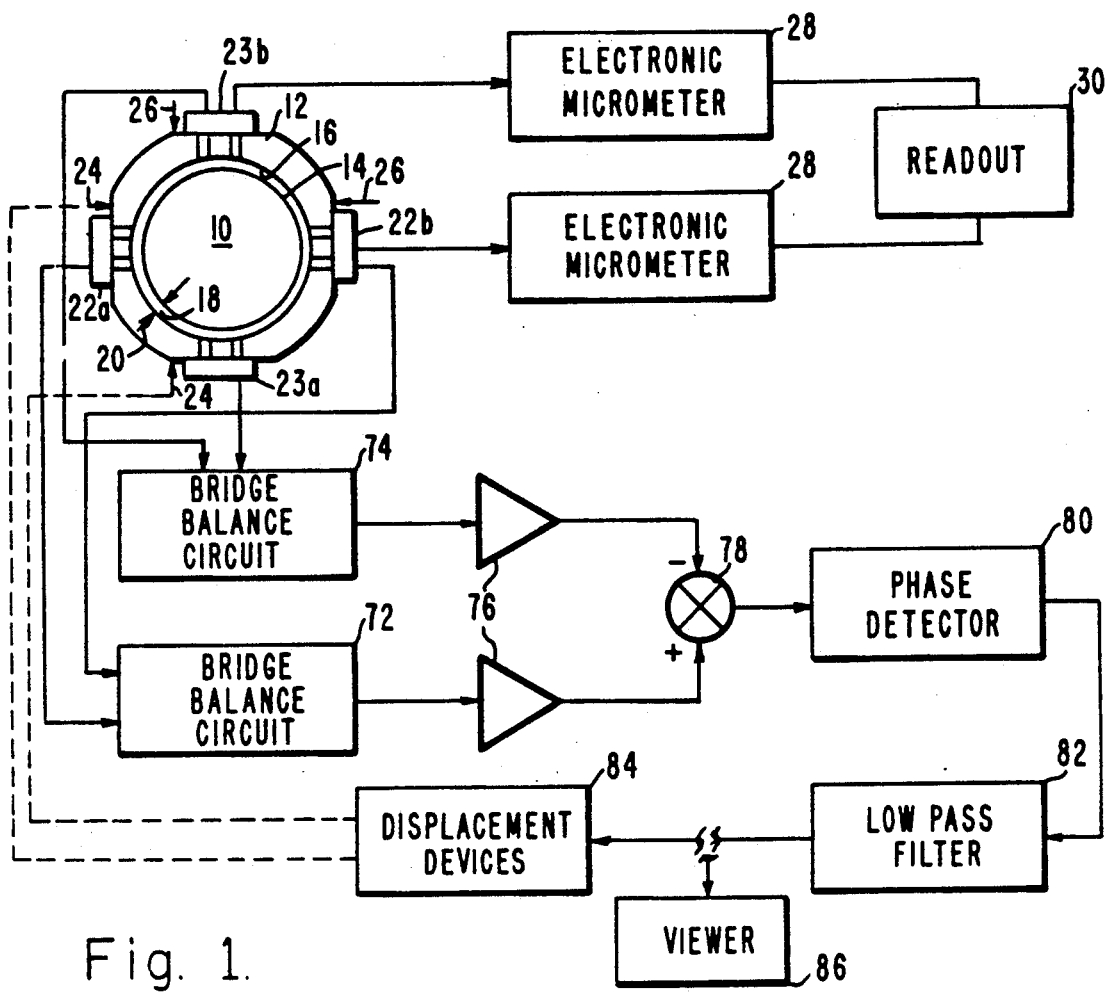
Figure 2:
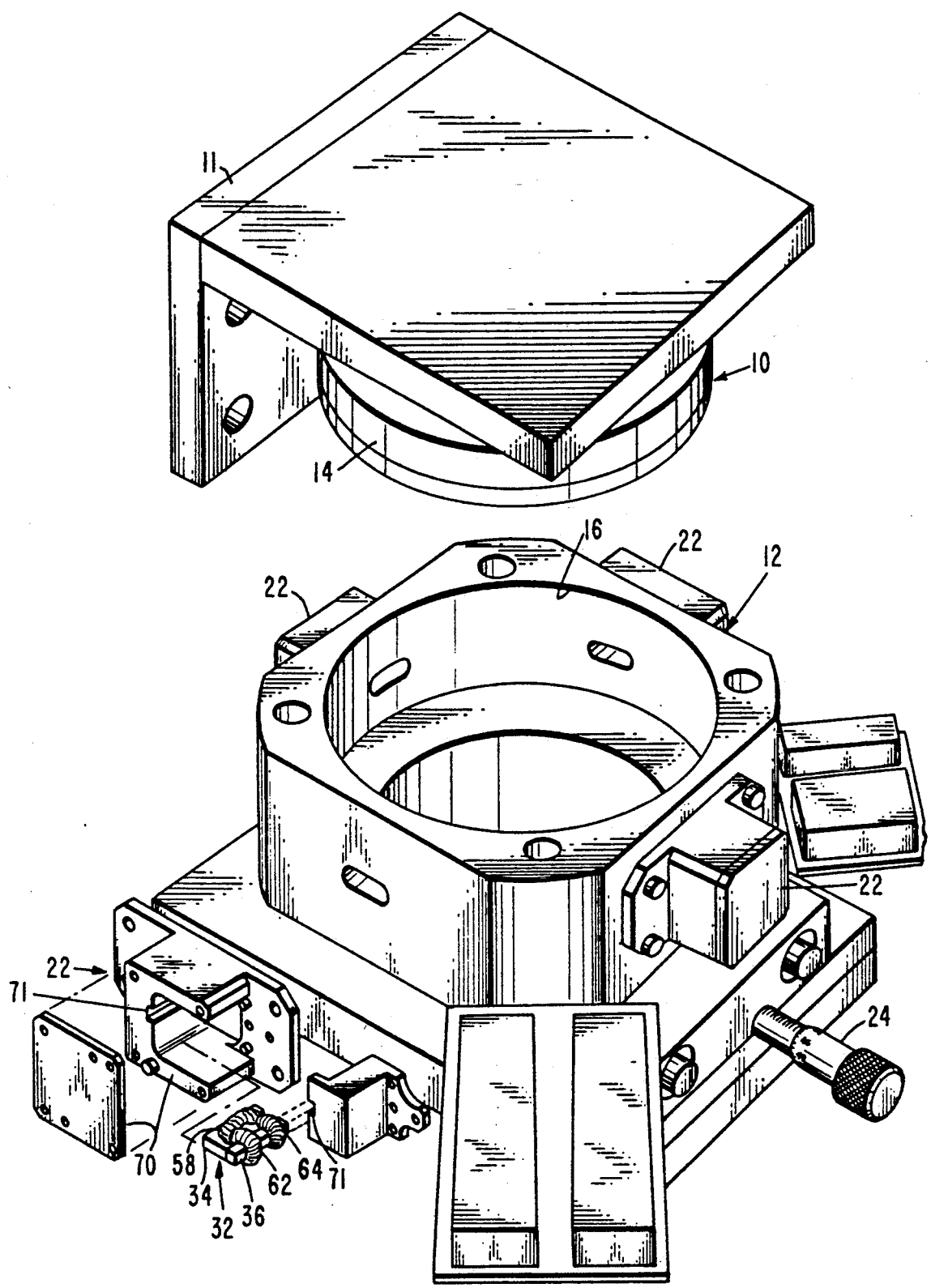
Figure 6:
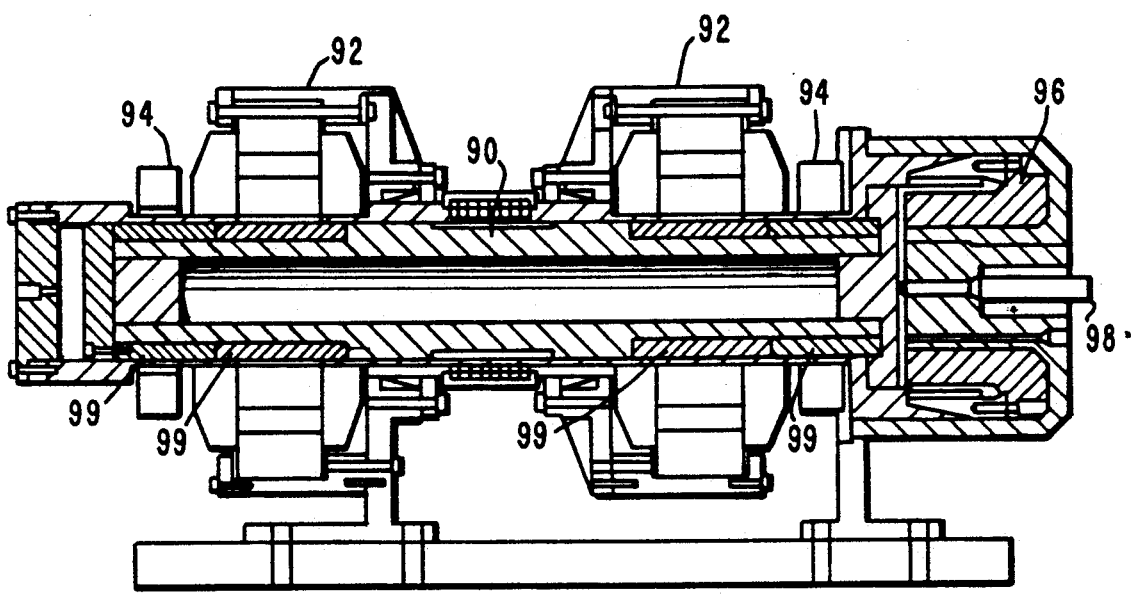
Figure 7:
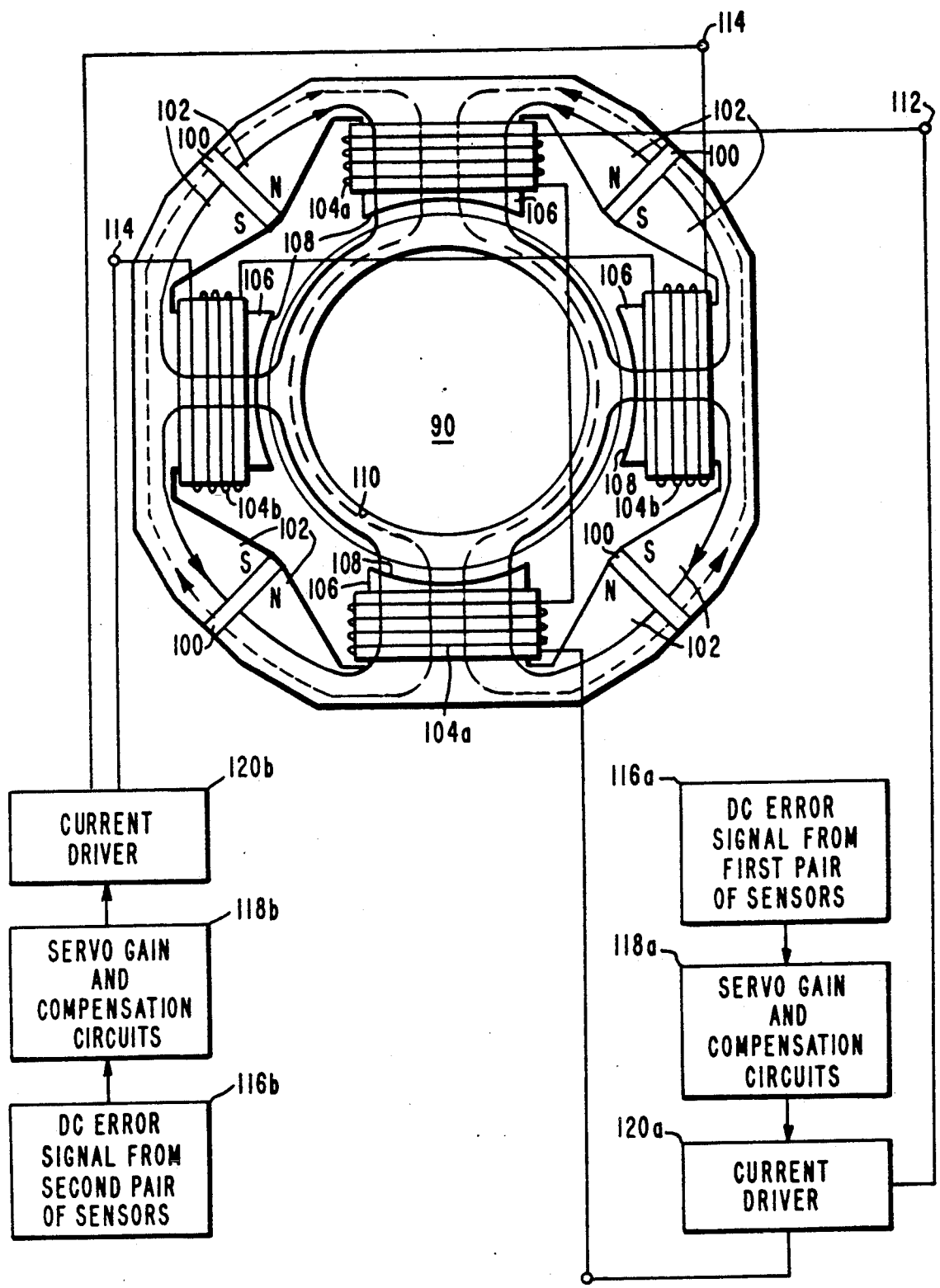

The simulated magnetic bearing fixture of FIGS. 1 and 2 comprises a fixed piston subassembly 10 surrounded by a movable cylinder 12. As shown in FIG. 2, piston 10 is secured to a frame 11 which is bolted to a two-axis micro-manipulator which moves the cylinder in radial translation relative to the piston with lead screws along quadrature axes. In an engineered bearing, such as shown in FIGS. 6 and 7, piston 10 is the moving member, and cylinder 12 is attached to fixed structure. This reverse arrangement was provided for convenience in making the desired manual adjustments and measurements. Piston 10 was placed within cylinder 12 so that their respective surfaces 14 and 16 were spaced from one another to provide a gap 18 (see FIG. 1) having a dimension designated by arrows 20. While shown in the drawings to have an appreciable dimension, gap 18 is exceedingly small, usually a few thousands of an inch or less than a millimeter in dimension. To maintain the gap of uniform annual dimension sufficient to prevent touching of surfaces 14 and 16, it is necessary to adjust the relative positions of the piston and the cylinder, unless the objective is simply to measure the clearance.

The present invention effects such adjustment by placing four proximity sensors, denoted as sensor pair 22a and 22b and sensor pair 23a and 23b, orthogonally about movable cylinder 12 in order to detect the dimensions of gap 18. Movement of cylinder 12 with respect to piston 10 is effected by a pair of micrometer screws in the directions represented by arrows 24. In FIG. 2, one of the micrometers, rather than its direction of movement, is also designated by indicium 24. These micrometer movements are opposed by a bias force in the directions denoted by arrows 26, such bias being effected, for example, by stiff springs. The amount of displacement of cylinder 12 is sensed and quantified by a pair of electronic micrometers 28 of conventional construction, whose output signals are displayed in a readout 30. For laboratory purposes, micrometer screws 24 are manually manipulated; in the engineered model, these movements are automatically made by a servo loop in response to measurements of the dimension of gap 18, as compared to a reference gap.

Figure 3:
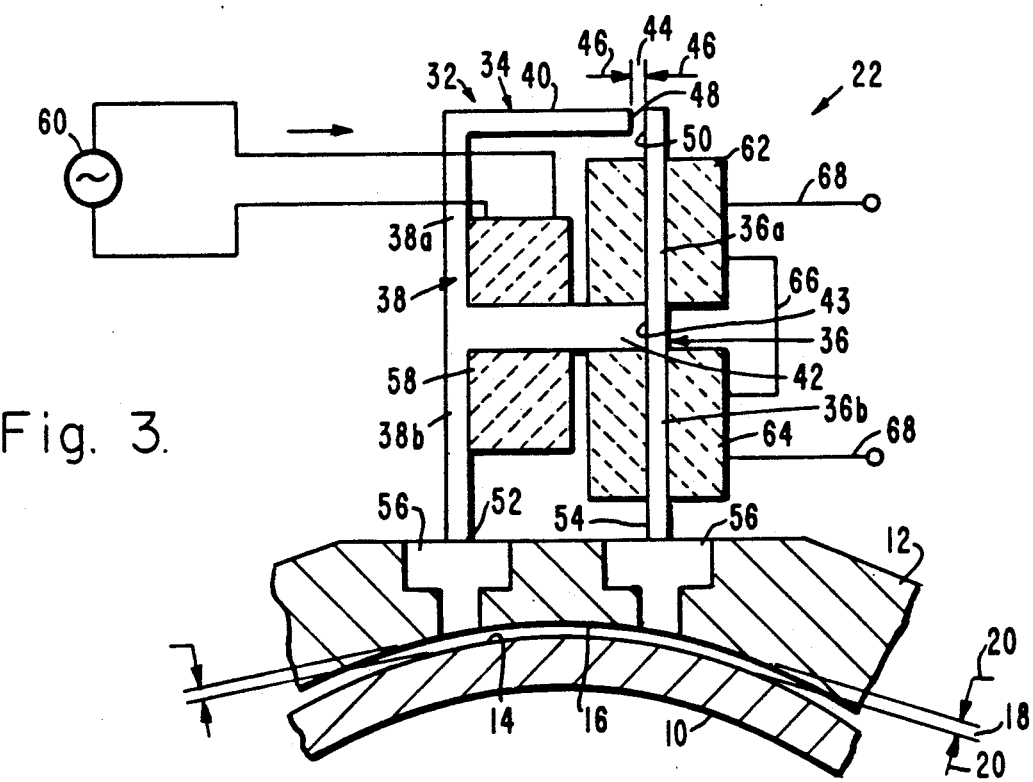

Whether the adjustments in gap 18 are made manually or automatically, the sensing thereof is obtained by novel concepts embodied in proximity sensors 22. One such sensor is depicted in FIGS. 2 and 3 and includes a magnetic assembly 32 provided with a F-shaped core 34 and a bar core 36 having, as shown in FIG. 3, upper and lower portions 36a and 36b. Both cores are fabricated preferably using laminations of magnetic steel.

As best shown in FIG. 3, F-shaped core 34 includes a supporting leg 38, having upper and lower portions 38a and 38b, and a pair of shorter and longer legs 40 and 42 which extend generally perpendicularly from supporting leg 38. Leg 42 also has a cross-sectional area double that of supporting leg 38, shorter leg 40 and bar core 36, because the flux density is twice as high in the core leg which is common to both parallel circuits. Bar core 36 is forced into intimate contact at a bond 43 to the free end of longer leg 42 by the clamping action of the three piece housing. Because bar core 36 and supporting leg 38 of F-shaped core 34 are held parallel to one another by the housing, a gap 44 having a dimension denoted by arrowheads 46 extends between an end 48 on shorter leg 40 and a side surface 50 on bar core 36. Gap 44 has a fixed dimension and, therefore, can be used as a reference dimension extending between facing arrows 46. The core is held in place by slots in the housing, to guarantee the referenced air gap dimension. Ends 52 and 54 respectively of supporting leg 38 and bar core 36 are secured to pole pieces 56 which terminate at surface 16 of cylinder 12.

A primary coil 58 is wound about longer leg 42 and is energized by an alternating current source 60 to provide a source of magnetomotive force which causes magnetic flux flow in two parallel paths. One path moves from longer leg 42 to upper portion 36a, across reference gap 44, through shorter leg 40, upper portion 38a and back to leg 42. The second path moves from leg 42 to lower portion 36b, through pole piece 56, across gap 18, through a magnetic target ring installed on piston 10, back across gap 18, through the other pole piece 56, lower portion 38b and back to leg 42. As stated above, because leg 42 is common to both paths, it is required that its cross sectional area be twice as large as the area of the other core elements in the parallel paths. A pair of secondary coils 62 and 64 are wound about bar core 36 respectively on bar core portions 36a and 36b and extend from either side of longer leg 42. Voltage is induced in the two secondary windings which is proportional to the number of turns and the rate of change of flux in the magnetic path containing the section of the bar core on which the secondary coil is wound. The secondary coils are coupled by connecting wire 66, causing the two secondaries to be connected in phase opposition. This connection causes the two secondary induced voltages to be subtracted resulting in a voltage null output when the flux flowing in the parallel magnetic flux paths through gap 18 and gap 44 are equal. Because gap 44 has a fixed reference dimension, secondary coil 62 is sometimes also referred to as a reference coil. In a like manner, because gap 18 is variable and its dimension between double headed arrows 20 must be sensed as to any changes in its dimension, secondary coil 64 is sometimes referred to as a sense coil.

As shown in FIG. 2, magnetic assembly 32 is housed within a casing 70 which is secured to cylinder 12. Casing 70 has internal slots 71 for aligning the F-shaped and bar cores 34 and 36 of the transformer in a manner assuring the proper reference air gap dimension.

As shown in FIG. 1, the alternating current (ac) output voltage of the pair of proximity sensors 22a and 22b is coupled to a bridge balance circuit 72, and the pair of proximity sensors 23a and 23b is coupled to a second bridge balance circuit 74. Circuits 72 and 74 are coupled to respective integrated circuit amplifiers 76, and the outputs therefrom are fed into a transformer type summing circuit 78 for subtracting the amplified signals from bridge circuits 72 and 74. The signal output from summing device 78 is forwarded to a phase detector 80 which rectifies and filters the alternating current input. The direct current (dc) output of the phase detector is phase sensitive, i.e., the direct current magnitude is proportional to the difference in the dimension of gap 18 with respect to that of gap 44. The direct current polarity indicates that gap 44 is larger or smaller than gap 18. The output of phase detector 80 is fed to a low pass direct current amplifier 82 and thence to displacement devices 84 or a viewer 86. For laboratory purposes, a viewer 86 was used so that micrometer screws 24 could be manually turned. For a fully automated arrangement, displacement devices 84 are coupled directly to cylinder 12 or its equivalent for movement thereof. Alternatively, if piston 10 is the movable element, displacement devices 84 would be coupled to magnetic bearings for adjusting the position of piston 10 within cylinder 12.

Figure 4A:
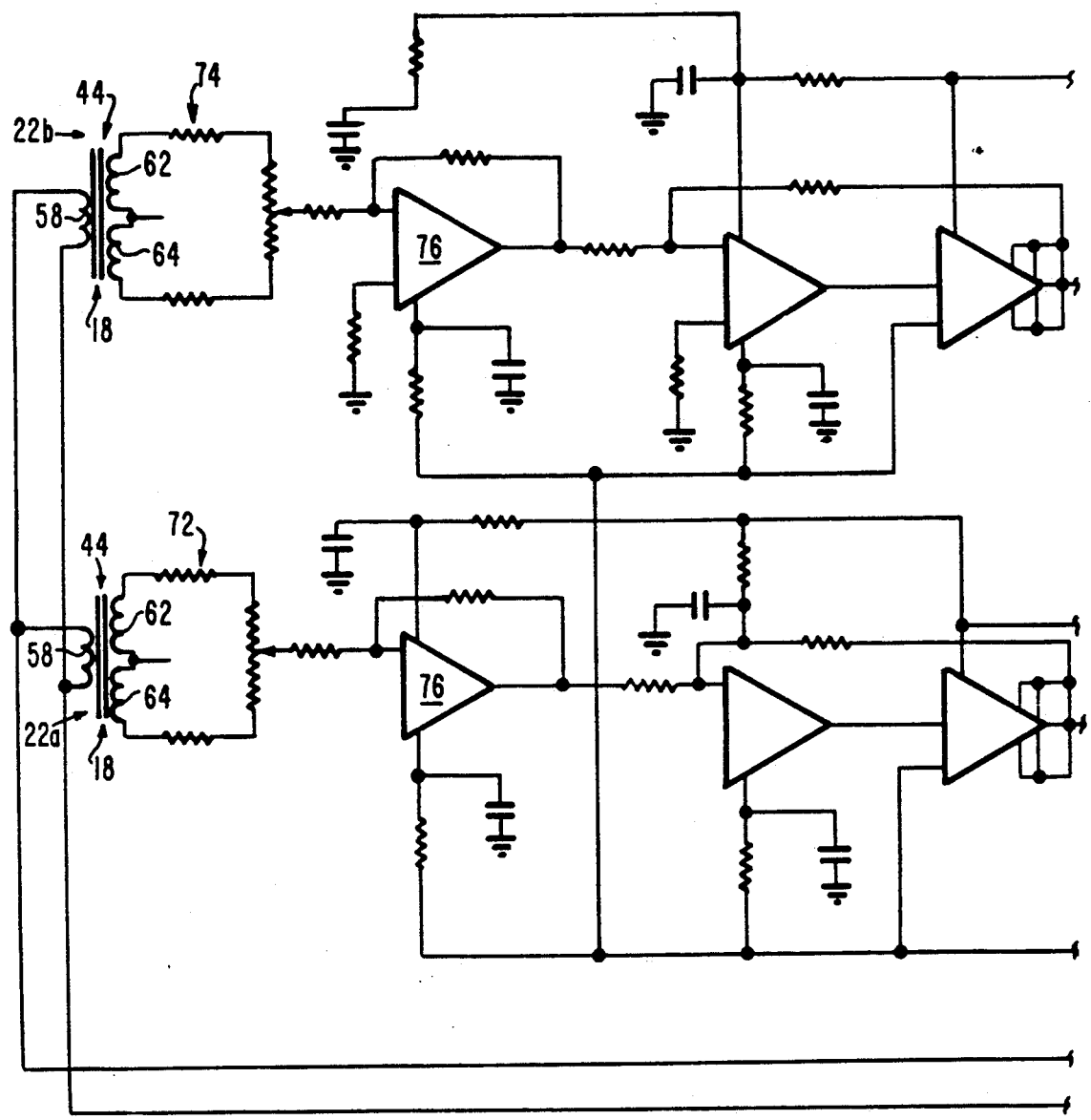
FIGS. 4a and 4b show the circuit schematic of the proximity sensor signal conditioning electronics for one pair of differentially positioned sensors. The sensors are shown in their electrical equivalent circuit form.
Figure 4B:
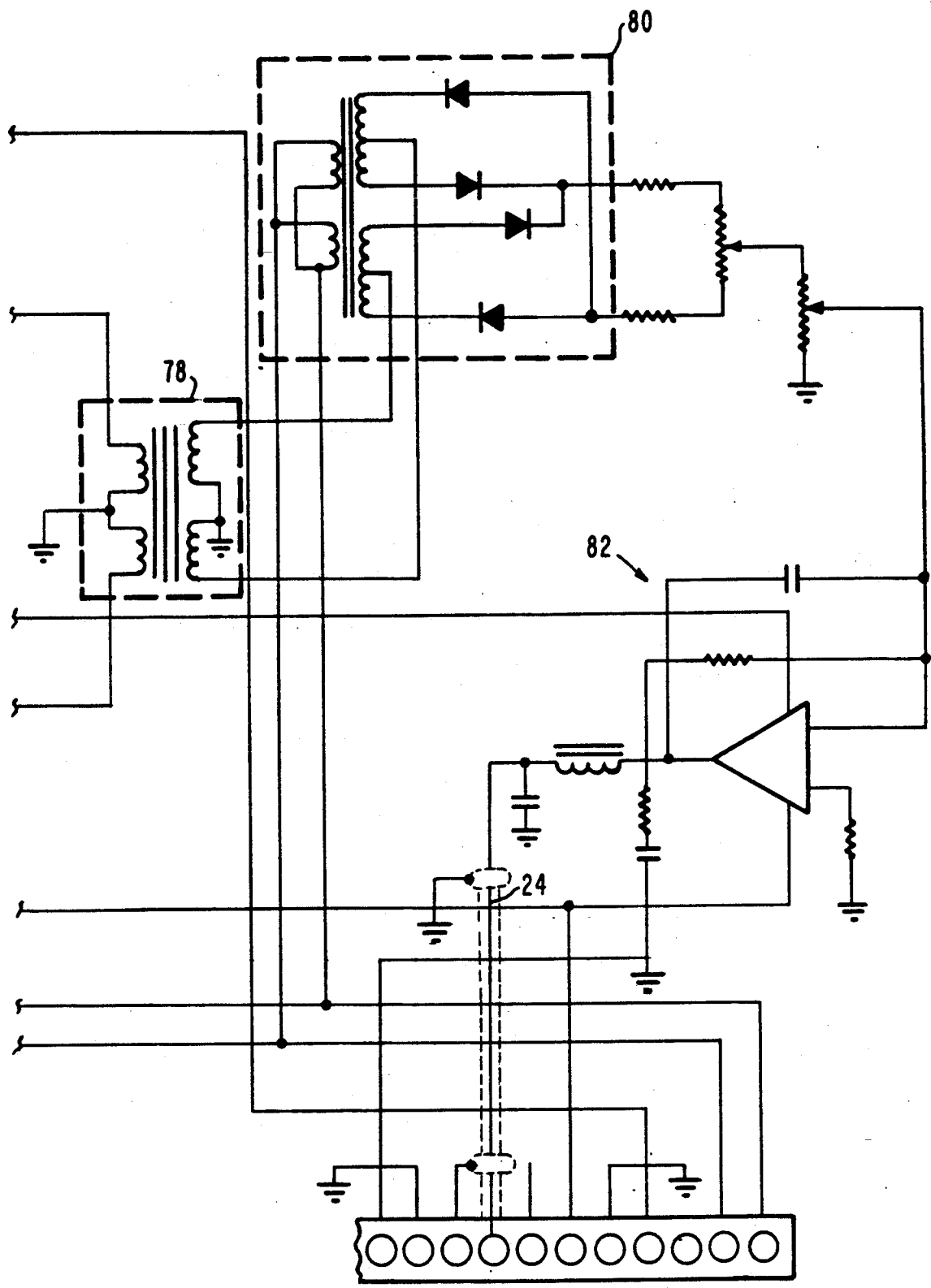

The corresponding wiring diagram for sensors 22a and 22b, bridge balance circuits 72 and 74, voltage amplifiers 76, summing circuit 78, phase detector 80, and low-pass filter 82 is shown in FIGS. 4a and 4b.

Figure 5:
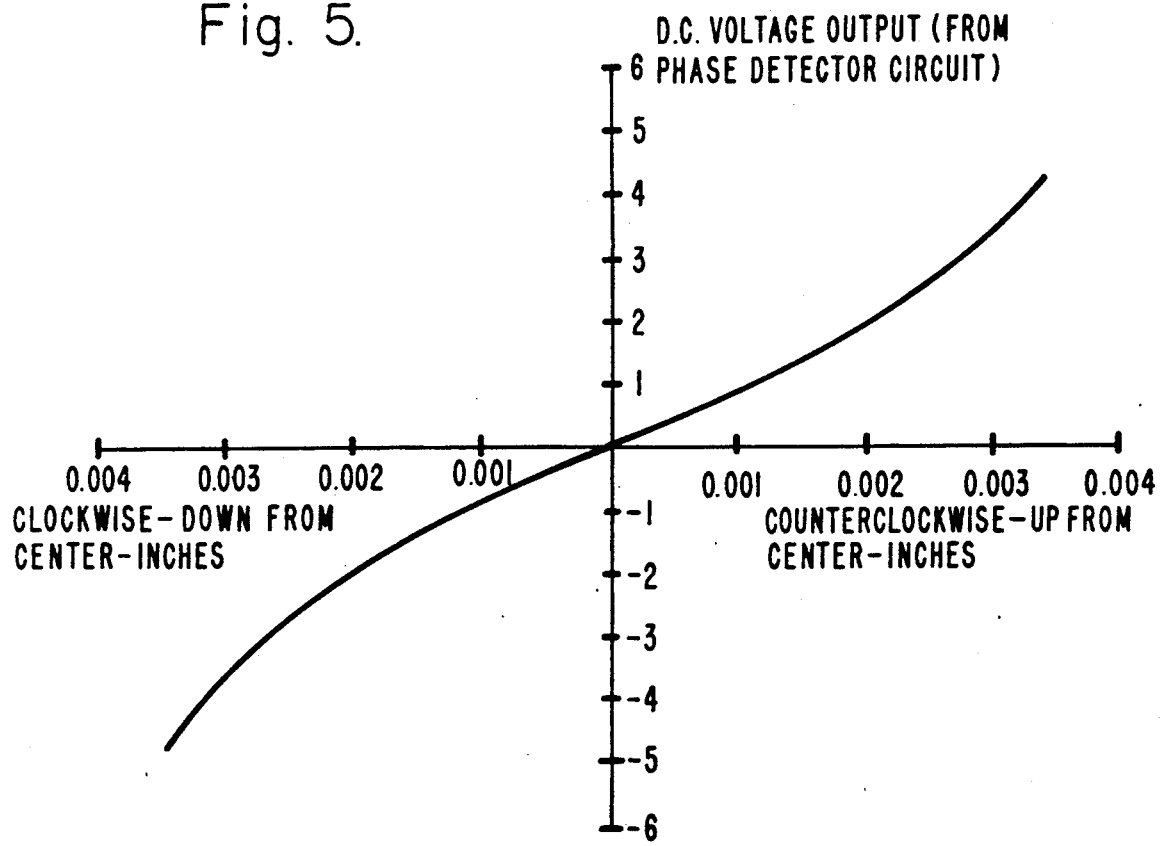

FIG. 5 illustrates the dc voltage output from low-pass filter amplifier 82 plotted versus radial displacement induced by the manual controls. This is the proximity sensor calibration characteristic.

In operation, secondary windings 62 and 64, due to their locations on bar core 36, sense the alternating current flux flowing in their respective parallel magnetic paths through fixed gap 44 and variable gap 18. The alternating current voltage output is a phase sensitive indication of the variable gap displacement error relative to the reference air gap, and an output voltage null through wire 68 occurs when the variable and fixed air gaps are equally dimensioned. When the dimensions are not equal, the output voltage reflects the difference and the circuitry provides the necessary phase sensitive output information in order to sufficiently move gap 18 to equalize its dimension with that of gap 44. Because the reluctance of the two magnetic paths is primarily a function of the dimensions of gaps 18 and 44, the output null indication is inherently temperature insensitive.

Specifically, the gap matching proximity sensor described above is designed to be used as the feedback element in a servo which controls the displacement of a moving member relative to a fixed structure. The size of the reference gap nominally determines the mechanical reference for the control of displacement in the system; that is, the sensor output is a phase sensitive servo error signal whose magnitude is proportional to the clearance error and whose phase indicates the direction the moving member must be displaced to correct the error. In this mechanization, null stability is the important sensor parameter since it affects the clearance error directly. Sensor scale factor and linearity is of lessor importance because this parameter only affects servo loop gain. With reference to FIG. 3, if the length of the core in the reference and sense magnetic paths are reasonably similar and the core permeability is high (greater than 100) over the desired temperature range and the sensor housing temperature coefficient matches that of the core, the differential reluctance of the two parallel magnetic paths is inherently temperature insensitive. This being true, the sensor null displacement becomes essentially determined by the condition where the clearance between the moving member and the fixed structure is equal to one half the reference air gap. There will be a variation in scale factor (volts rms/inch) due to temperature determined by the coefficient of expansion of the core material which causes the variable air gap to change. This effect can be minimized by the careful choice of sensor core material and/or by inversely varying the servo loop gain as a function of core temperature. The excitation frequency of primary coil 58 can vary from 1-40 kHz. The null stability of the device can be made very high due to the alternating current excitation which allows the use of high drift free ac amplification ahead of the phase detector circuit.

More specifically, the arrangement illustrated in FIGS. 1-3 comprise a transformer circuit with two parallel magnetic paths formed by a two piece magnetic core and a ferromagnetic target on the moving member. When two piece core 34 and 36 is assembled as shown in FIGS. 1 and 2, an upper magnetic or reference circuit with fixed air gap 44 in series is formed. The lower magnetic or sensor circuit is closed across the open ends of the assembled two piece core by two air gaps 18 in series with the target iron on moving member 10. The primary or excitation winding 58 is wound on central or longer core leg 36. It must have double the area of core legs 36, 38, and 40 in order to keep the flux density uniform in the magnetic material of the core. The primary winding is excited by alternating current voltage source 60 which can range from 1 to about 40 kHz. The primary winding serves as a source of MMF which causes magnetic flux to flow in the two parallel paths as shown in Equation (1).

$$\phi = \frac{0.4\pi\, NI\, \sin\omega t}{\frac{l_c}{\mu A_c} + \frac{l_g}{A_g}} = \frac{MMF}{R} \text{ Maxwells} \quad (1)$$

where
$\phi$ is the magnetic flux in Maxwells,
R is the circuit reluctance in Gilberts,
MMF is the magnetomotive force in oersteds,
$\mu$ is the core permeability,
A is area in square centimeters
l is length in centimeters,
$\Omega$ is the excitation frequency in Rad/Sec, subscript "c" refers to the magnetic core, and "g" refers to the air gaps. The voltage induced in each secondary winding 62 and 64 wound on each of core leg portions 36a and 36b is a function of the rate of change of flux in one of the magnetic paths times the number of secondary turns, i.e., $$E_s = -N \frac{d\phi}{dt} \text{ Volts.} \quad (2)$$

The self inductance of the primary winding is:

$$L_p = \frac{0.4\pi\, N_p^2 \times 10^{-8}}{R_T}, \text{ and } R_T = \frac{R_1 R_2}{R_1 + R_2} \quad (3)$$

where $R_T$ is the equivalent series reluctance of the two parallel magnetic paths, and subscripts 1 and 2 refer to the reference and sense magnetic paths respectively. The inductive reactance in ohms of the primary winding is:

$$X_p = \frac{0.8\pi f N_p^2 \times 10^{-8}}{R_T} \quad (4)$$

and the primary magnetizing current in amperes is:

$$I_p = \frac{E_{max} \sin\omega t}{jX_p} = \frac{E_{max} \sin\omega t}{(0.8\pi^2 f)_p N^2 + 10^{-8}}, \quad (5)$$

where f is the frequency in Hz.

Combining equations (1) and (2) yields the following expression for the voltage induced in the two secondary windings:

$$E_{s1} = -\left(\frac{N_s R_T}{N_p R_1} \times 10^8\right) E_{max} \cos\omega t, \text{ and} \quad (6)$$

$$E_{s2} = -\left(\frac{N_s R_T}{N_p R_2} \times 10^8\right) E_{max} \cos\omega t. \quad (7)$$

If the two secondaries are connected in phase opposition, the proximity sensor open circuit voltage output is:

$$E_{s2} - E_{s1} = \left(\frac{R_2 - R_1}{R_1 + R_2}\right)\left(\frac{N_s}{N_p} \times 10^8\right) E_{max} \cos\omega t. \quad (8)$$

The proximity sensor which was designed, fabricated, and tested is shown in FIGS. 2 and 3. The sensor electronic signal processing system required to produce an electrical signal proportional to the differential air gap displacement is shown in FIGS. 4a and 4b. The proximity sensor package is composed of four subassemblies. The sensor subassembly with the three coils installed on the two piece core is clamped rigidly in the main housing when the side piece and the top piece are screwed into place. The core is constructed using Carpenter HyMu 80 magnetic steel with laminations 0.007 inches in thickness. The housing material was fabricated using 174PH stainless steel which has a temperature coefficient which is very close to that of the magnetic steel over a temperature range of 200° C. to −200° C. This allows the sensor to be operated over this temperature range in a rigidly clamped condition without distorting the core. The device is operable in a shock and vibration environment without response to microphonics due to the clamped design feature.

Eight proximity sensors of the type described were fabricated and tested. The design parameters chosen for the test articles are listed below:
(1) Excitation—10 volts RMS 10 KHz,
(2) Primary winding—300 turns #28 wire,
(3) Secondary windings—600 turns #40 wire,
(4) Mean length of core—3.27 cm,
(5) Reference air gap—0.03 cm,
(6) Sense air gap—0.23 cm,
(7) Area of all air gaps—0.64 cm,
(8) Area of core material—0.61 cm,
(9) Core flux density—1170 gauss rms,
(10) Magnetizing current—0.0095 Amperes (peak),
(11) Calculated scale factor—3.4 Volts RMS/Mil.

Ferrite targets and pole pieces were used in the following tests as a matter of convenience. This choice minimized eddy current effects without having to machine laminated steel in the fabrication of the test fixtures. The electronic circuit shown in FIGS. 4a and 4b was also designed to test two sensors in a back-to-back configuration. A bridge balance circuit was provided to adjust the proximity sensor null at the desired air gap. The phase sensitive ac output of the bridge was amplified and then phase detected and filtered to produce a dc output voltage. The dc output voltage was measured at
various points in the desired displacement range (0 to ±0.006 inches).

FIG. 2 shows the proximity sensor test set up used to calibrate the eight proximity sensors which were constructed and evaluated. This test set up simulates the proximity sensing system for a pair of magnetic bearings (see FIG. 6) which levitates a piston in a cylinder. Four sensors were installed on flat surfaces machined on the outside of the simulated cylinder. Ferrite pole pieces project through, from the sensor mounting surface to the inside of the cylinder. A 0.25 inch (0.64 mm) hole was drilled in the space between pole pieces and filled with epoxy. The flat surface and the inside of the cylinder were lapped to make the pole pieces conform to the terminating surface. The sensors were fastened to the cylinder flat with four 4-40 machine screws fitting tapped holes in the cylinder wall. The simulated piston was provided with a ferrite target ring to complete the sensing magnetic circuit. The test fixture was used to move the simulated piston in two orthogonal directions aligned along the sensitive axes of the orthogonally mounted sensor pairs. As shown, a two axis micromanipulator provided the desired orthogonal motion over a range of ±0.0035 inch (0.0089 mm) which simulated the piston/cylinder radial clearance. The cylinder in this test set up was fixed to stationary structure. An electronic micrometer was used to precisely measure the piston displacement from the centered position. In this test procedure, the piston was moved in first the "x" direction and then the "y" direction; the cross talk was measured for each calibration point taken along the sensitive axis. In preparation for these tests, each sensor was nulled independently at the mechanical center position. Then the scale factor was adjusted by varying the ac amplifier gain to be 2.0 volts dc at ±0.002 inches (0.005 mm) displacement from center. Two sets of four proximity sensors were tested in this manner. One set is identified as that for the forward magnetic bearing on the test data sheets and the other as that for an aft magnetic bearing. These designations indicate the locations on the productized magnetic bearing assembly on which the eight proximity sensors were installed. FIG. 5 shows the calibration of one of the sensor pairs tested prior to installation in the magnetic bearing assembly of FIG. 6. The remaining seven calibration curves were closely similar to that of FIG. 5. The test conditions and cross talk measurements for one of the sensor pairs are shown on the calibration chart; other sensor pairs were substantially the same, as shown in the following tables, in which CCW and CW respectively mean counter-clockwise and clockwise:

TABLE I

| Deflection from Center | Sensitive Axis Volts dc | | Cross Axis Millivolts, dc | |
| --- | --- | --- | --- | --- |
| Inches | CCW | CW | CCW | CW |
| -0- | −.0092 | −.0086 | +9.2 | +10.0 |
| .0005 | +.466 | −.463 | −7.6 | +11.2 |
| .0010 | +.912 | +.927 | +6.0 | +12.5 |
| .0015 | +1.436 | −1.431 | +4.3 | +14.0 |
| .0020 | +2.020 | 2.011 | +2.0 | +15.0 |
| .0025 | +2.667 | −2.667 | +0.3 | +16.2 |
| .0030 | +3.526 | −3.546 | −1.8 | +16.8 |
| .0035 | +4.438 | −4.860 | −2.7 | +18.0 |

TABLE II

| Deflection from Center | Sensitive Axis Volts dc | | Cross Axis Millivolts, dc | |
| --- | --- | --- | --- | --- |
| Inches | CCW | CW | CCW | CW |
| -0- | +.0031 | +.0086 | −8.7 | −7.9 |
| .0005 | +.436 | −.440 | −8.2 | −8.5 |
| .0010 | +.892 | −.910 | −7.3 | −9.0 |
| .0015 | −1.410 | −1.441 | −6.7 | −8.1 |
| .0020 | −2.003 | −2.002 | −5.1 | −7.7 |
| .0025 | +2.762 | −2.701 | −4.9 | −7.2 |
| .0030 | −3.744 | −3.795 | −2.9 | −6.7 |
| .0035 | +5.024 | −5.478 | −2.1 | −5.2 |

TABLE III

| Deflection from Center | Sensitive Axis Volts dc | | Cross Axis Millivolts, dc | |
| --- | --- | --- | --- | --- |
| Inches | CCW | CW | CCW | CW |
| -0- | +.0032 | — | +8.2 | +8.1 |
| .0005 | +.449 | −.448 | +10.2 | +5.9 |
| .0010 | +.911 | −.912 | +11.9 | +4.3 |
| .0015 | +1.427 | −1.418 | +14.6 | +3.7 |
| .0020 | +2.006 | −1.985 | +16.0 | +1.3 |
| .0025 | +2.698 | −3.58 | +17.3 | −1.1 |
| .0030 | +3.547 | −3.456 | +18.5 | −3.3 |
| .0035 | +4.661 | −4.596 | +20.0 | −6.5 |
| .0040 | +6.286 | −6.423 | +22.0 | −8.4 |

TABLE IV

| Deflection from Center | Sensitive Axis Volts dc | | Cross Axis Millivolts, dc | |
| --- | --- | --- | --- | --- |
| Inches | CCW | CW | CCW | CW |
| -0- | −.00314 | −.00147 | — | — |
| .0005 | +.455 | −.444 | −6.2 | −3.1 |
| .0010 | +.907 | −.910 | −6.4 | −2.9 |
| .0015 | +1.446 | −1.420 | −5.6 | −1.9 |
| .0020 | +2.063 | −2.042 | −4.6 | −1.0 |
| .0025 | +2.815 | −2.777 | −3.0 | −0.5 |
| .0030 | +3.819 | −3.874 | −1.9 | +1.9 |
| .0035 | −5.254 | −5.791 | +.2 | +3.6 |

The measured data shows good gain slope symmetry on either side of the mechanical center and the data taken with four sensor pairs showed remarkable similarity.

Referring now to FIGS. 6 and 7, an engineered version of the present invention includes a translatable shaft or displacer 90 which is supported by a pair of magnetic bearings 92 whose cross section is shown in FIG. 7. Sensors 94, similar to those illustrated in FIGS. 1-3 are placed next to the bearings. Displacer 90 is translated by a motor 96. An axial sensor 98 is positioned at one end of shaft 90 and senses its axial position; this information is used as feedback in a translation control servo loop. The magnetic bearings support the piston in the radial direction so that the translation motion above is frictionless. Ferromagnetic rings 99 are bonded to shaft 90 and placed adjacent to bearings 92 and sensors 94 to ensure good flux paths for the magnetic bearings and the proximity sensors respectively.

As shown in FIG. 7, each bearing comprises four sets of permanent magnets 100, for example, of a samarium-cobalt composition, to which magnetic bearing pole pieces 102 are bonded. Placed between each magnetic and pole piece pair are four orthogonally placed magnetic bearing electromagnet control coils 104a and 104b wound about laminated pole pieces 106. Pole pieces 106 terminate in curved surfaces 108 which are positioned closely to periphery 110 and a ring 99 (see FIG. 6) of magnetic material on shaft 90. Coil pairs 104a and 104b and their respective wiring are connected as shown so that one pair of coils 104a is interconnected and terminate at termini 112 and the other pair of coils 104b terminates at termini 114.

Utilizing the circuitry illustrated in FIGS. 4a and 4b, dc error signals from one or the other pair of sensors, as denoted by boxes 116a and 116b are fed to servo gain and compensation circuits 118a and 118b which, in turn, are forwarded to current drivers 120a and 120b. The current drivers with signal inputs from the respective servo gain and compensation circuits are coupled to one of termini 112 and 114 to drive current through their respective electromagnetic coils 104a and 104b, thus causing shaft 90 to be displaced radially between opposing pairs of pole pieces 108. This radial motion of shaft 90 within its bearings 92 is sensed by proximity sensors 94 and used to close a levitation servo loop so that the gap dimensions under the opposing pole pieces are maintained equal.

Although the invention has been described with respect to particular embodiments thereof, it should be realized that various changes and modifications may be made therein without departing from the spirit and scope of the invention.

What is claimed is:

1. Apparatus for dimensioning a gap between surfaces of relatively movable members of magnetic material, comprising:
   means utilizing the magnetic properties of the members for sensing the dimension of the gap through a magnetic circuit passing through the members;
   means for comparing the gap dimension with a reference dimension in a reference magnetic circuit; and
   means for conforming the gap dimension to the reference dimension.

2. Apparatus for dimensioning a gap between relatively movable surfaces, comprising:
   means for sensing the dimension of the gap;
   means for comparing the gap dimension with a reference dimension; and
   means for conforming the gap dimension to the reference dimension;
   said sensing and comparing means including
      a magnetic assembly having a bar core and an F-shaped core which is installed on one of the relatively movable surfaces, said F-shaped core comprising a supporting leg and relatively longer and shorter legs extending from said supporting leg, said bar core secured to said longer leg, and a reference gap providing the reference dimension and extending between said shorter leg and said bar core,
      a primary winding wound on said common leg,
      means for exciting alternating current in said primary winding, and
      secondary windings wound on said bar core and connected together in phase opposition for providing an output based upon fluxed flowing in parallel magnetic paths through the gaps.

3. Apparatus for dimensioning a gap between relatively movable surfaces, comprising:
   means for sensing the dimension of the gap;
   means for comparing the gap dimension with a reference dimension; and
   means for conforming the gap dimension to the reference dimension,
   said sensing and comparing means including a magnetic assembly having an F-shaped core and a bar core, in which
      said F-shaped core comprises a supporting leg generally parallel to said bar core, and a pair of relatively longer and shorter parallel legs joined to said supporting leg,
      said bar core has a length which is approximately equal to that of said supporting leg, and is joined to said longer leg and spaced from said shorter leg to provide the reference dimension, and
      said magnetic assembly is fixed with respect to one of the surfaces and is so positioned that said bar core and said supporting leg are spaced at their respective ends from the other surface to provide the gap dimension; and
      said conforming means includes a driver which moves one surface with respect to the other until the gap dimension corresponds to the reference dimension.

4. Apparatus according to claim 3 in which said longer leg is positioned between said shorter leg and the end of said supporting leg, and said magnetic assembly includes a driving primary coil wound about said longer leg and reference and sensing coils wound about said bar core respectively on opposite sides of said longer leg.

5. Apparatus according to claim 4 in which said F-core and said bar core comprise essentially the same ferromagnetic materials, the magnetic path lengths of said coils are approximately the same, the permeability of the ferromagnetic material is generally in excess of 100 over the desired temperature range, and the sensor housing temperature coefficient matches that of the core, to make the differential reluctance of the two parallel paths inherently insensitive to temperature changes.

6. Apparatus according to claim 5 wherein said magnetic assembly is arranged to generate stable magnetic flux conforming to the reference dimension and variable magnetic flux conforming to the variable gap dimension, and in which said comparing means comprises means for generating a direct current error signal representing any difference between the magnetic fluxes, and said conforming means comprises servo gain and compensation electronic circuits for generating correction signals to change the gap dimension.

7. Apparatus according to claim 1 in which said sensing means comprises a magnetic assembly for generating stable magnetic flux conforming to the reference dimension and variable magnetic flux conforming to the gap dimension, said comparing means comprises means for generating a direct current error signal representing any difference between the magnetic fluxes, and said conforming means comprises servo gain and compensation electronic circuits for generating correction signals to change the gap dimension.

8. A method for dimensioning a gap between surfaces of relatively movable members of magnetic material, comprising the steps of:
   utilizing the magnetic properties of the members, sensing the dimension of the gap through a magnetic circuit passing through the members;
   comparing the gap dimension with a reference dimension in a reference magnetic circuit; and
   conforming the gap dimension to the reference dimension.

9. A method according to claim 8 in which said sensing step comprises the step of generating stable magnetic flux which conforms to the reference dimension and variable magnetic flux which conforms to the gap dimension, said comparing step comprises the step of generating a direct current error signal representing any difference between the magnetic fluxes, and said conforming step comprises the step of generating correction signals by servo gain and compensation electronic circuits for changing the gap dimension.

10. Apparatus according to claim 2 further comprising:
    a stationary member supporting said bar core and said F-shaped core, thereby providing a support for one of the surfaces;
    a pair of magnetic bearings secured to said stationary member; and a translatable shaft with portions terminated by the other of the surfaces and disposed to be magnetically supported by said bearings.

11. Apparatus according to claim 10 further including an axial sensor positioned at one end of said shaft for sensing its axial position.

12. Apparatus according to claim 10 further including:

means for sensing dc error signals from said sensing means;

servo gain and compensation circuits coupled to said dc error signal sensing means; and current drivers coupled to said servo gain and compensation circuits for receiving the signals and for driving said magnetic bearings for enabling said shaft to be displaced radially between opposing pole pieces of said bearings.

* * * * *

UNITED STATES PATENT AND TRADEMARK OFFICE
CERTIFICATE OF CORRECTION

PATENT NO. : 5,036,236   Page 1 of 2
DATED : July 30, 1991
INVENTOR(S) : DOUGLAS W. WILSON It is certified that error appears in the above-identified patent and that said Letters Patent is hereby corrected as shown below:

ABSTRACT, line 1, delete "pricisely" and substitute therefor --precisely--.

ABSTRACT, line 12, delete "suppermost" and substitute therefor --uppermost--.

ABSTRACT, line 22, insert the word --and-- between the words "range," and "by".

ABSTRACT, line 25, delete "mode" and substitute therefor --made--.

Column 3, line 12, of the specification, delete "develop-mentally" and substitute therefor --developmentally--.

Column 7, line 24, of the specification, delete "Ω" and substitute therefor -- ω --.

Column 7, line 26, of the specification, beginning with the words "The voltage..." begin a new paragraph.

Column 7, equation (5), line 54, of the specification, insert "=" after Ip so that the equation reads:

$$= \frac{E_{max} \sin \omega t}{jX_p} = \frac{E_{max} \sin \omega t}{(0.8\pi^2 f)_p N^2 \times 10^{-8}}$$

UNITED STATES PATENT AND TRADEMARK OFFICE
CERTIFICATE OF CORRECTION

PATENT NO. : 5,036,236
DATED      : July 30, 1991
INVENTOR(S): DOUGLAS W. WILSON It is certified that error appears in the above-identified patent and that said Letters Patent is hereby corrected as shown below:

Column 9, TABLE II, delete minus (-) signs and insert the plus (+) signs in front of the following figures so that the column under the heading "Sensitive Axis Volts dc - CCW" reads as follows:

```
+.0031
+.436
+.892
+1.410
+2.003
+2.762
+3.744
+5.024
```

Column 10, TABLE IV, last column under the heading "Cross Axis Millivolts, dc - CW", delete the minus (-) sign and insert the plus (+) sign in front of 0.5 so that it reads --+0.5--.

Signed and Sealed this

Sixteenth Day of February, 1993

Attest:

STEPHEN G. KUNIN

*Attesting Officer*   Acting Commissioner of Patents and Trademarks